United States Patent
Champion et al.

(10) Patent No.: US 9,309,936 B2
(45) Date of Patent: Apr. 12, 2016

(54) SLEEVE FOR DISK BRAKE CALIPER AND DISK BRAKE FITTED WITH SUCH A SLEEVE

(75) Inventors: Pascal Champion, Avrille (FR); Jan Vinck, Beaufort en Vallee (FR); Pascal Nocera, Chatou (FR); Eric Lemoine, Asnieres (FR)

(73) Assignee: CHASSIS BRAKES INTERNATIONAL B.V., Amsterdam (NL)

( * ) Notice: Subject to any disclaimer, the term of this patent is extended or adjusted under 35 U.S.C. 154(b) by 284 days.

(21) Appl. No.: 13/129,026

(22) PCT Filed: Oct. 21, 2009

(86) PCT No.: PCT/EP2009/063799
§ 371 (c)(1),
(2), (4) Date: Jul. 25, 2011

(87) PCT Pub. No.: WO2010/054918
PCT Pub. Date: May 20, 2010

(65) Prior Publication Data
US 2011/0284332 A1 Nov. 24, 2011

(30) Foreign Application Priority Data

Nov. 13, 2008 (FR) ...................................... 08 06312
Jan. 30, 2009 (FR) ...................................... 09 00429

(51) Int. Cl.
*F16D 65/00* (2006.01)
*F16D 55/2265* (2006.01)
*F16D 65/14* (2006.01)

(52) U.S. Cl.
CPC ...... *F16D 55/22655* (2013.01); *F16D 65/0087* (2013.01); *F16D 65/0093* (2013.01)

(58) Field of Classification Search
CPC ................ F16D 2055/0004; F16D 2055/0008; F16D 2055/0041; F16D 55/22655; F16D 65/00; F16D 65/0087; F16D 65/0093; F16D 65/0006
USPC .......... 188/73.43, 73.44, 73.45, 73.1; 384/16, 384/297
See application file for complete search history.

(56) References Cited

U.S. PATENT DOCUMENTS 3,616,876 A * 11/1971 Brooks ....................... 188/73.45
4,027,750 A * 6/1977 Kawamoto et al. ......... 188/73.45
(Continued)

FOREIGN PATENT DOCUMENTS

DE        2647911 A1   10/1977
DE      10245027 A1    4/2004
(Continued)

OTHER PUBLICATIONS

English Machine Translation of WO'695.*
(Continued)

*Primary Examiner* — Melody Burch
(74) *Attorney, Agent, or Firm* — Michael Best & Friedrich LLP

(57) ABSTRACT

The present invention relates to a sleeve (9) for a disk brake fitted with a caliper slidably mounted in a carrier by means of pins fixed rigidly to the caliper, said sleeve (9) being designed to receive one of said pins in a bore of the carrier.
According to the invention, such a sleeve is characterized in that it has ribs (10, 11) on a surface designed to come into contact with the carrier so that said ribs (10, 11) may be deformed in order to increase said contact surface when the sleeve (9) is compressed by an activation of the brake.

13 Claims, 2 Drawing Sheets

(56) References Cited

U.S. PATENT DOCUMENTS

| | | | |
|---|---|---|---|
| 4,200,173 A * | 4/1980 | Evans et al. | 188/73.45 |
| 4,372,428 A * | 2/1983 | Delaunay et al. | 188/73.35 |
| 4,753,326 A | 6/1988 | Weiler et al. | |
| 5,111,914 A * | 5/1992 | Thiel et al. | 188/73.34 |
| 5,299,665 A * | 4/1994 | Weiler et al. | 188/73.44 |
| 6,397,983 B1 | 6/2002 | Roszman et al. | |
| 2008/0029356 A1 | 2/2008 | Halasy-Wimmer et al. | |

FOREIGN PATENT DOCUMENTS

| | | |
|---|---|---|
| GB | 2156924 | 10/1985 |
| WO | WO-2008055695 A1 * | 5/2008 |
| WO | 2009/059762 A1 | 5/2009 |

OTHER PUBLICATIONS

English Machine Translation of DE-2647911.*

PCT/EP2009/063799 International Written Opinion dated Dec. 15, 2009 (5 pages).

PCT/EP2009/63799 International Search Report.

* cited by examiner

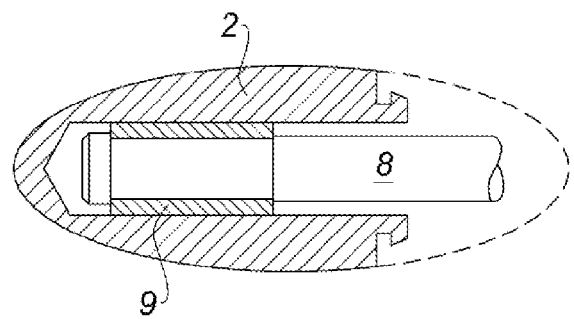
Fig. 2
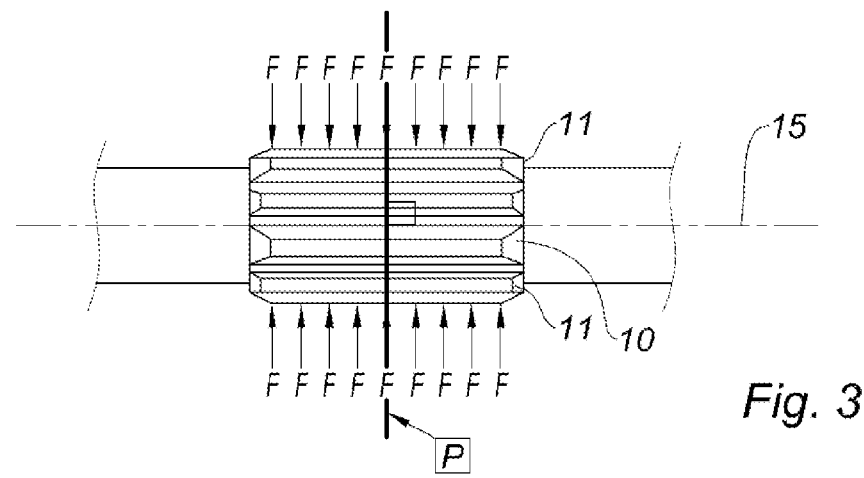
Fig. 3
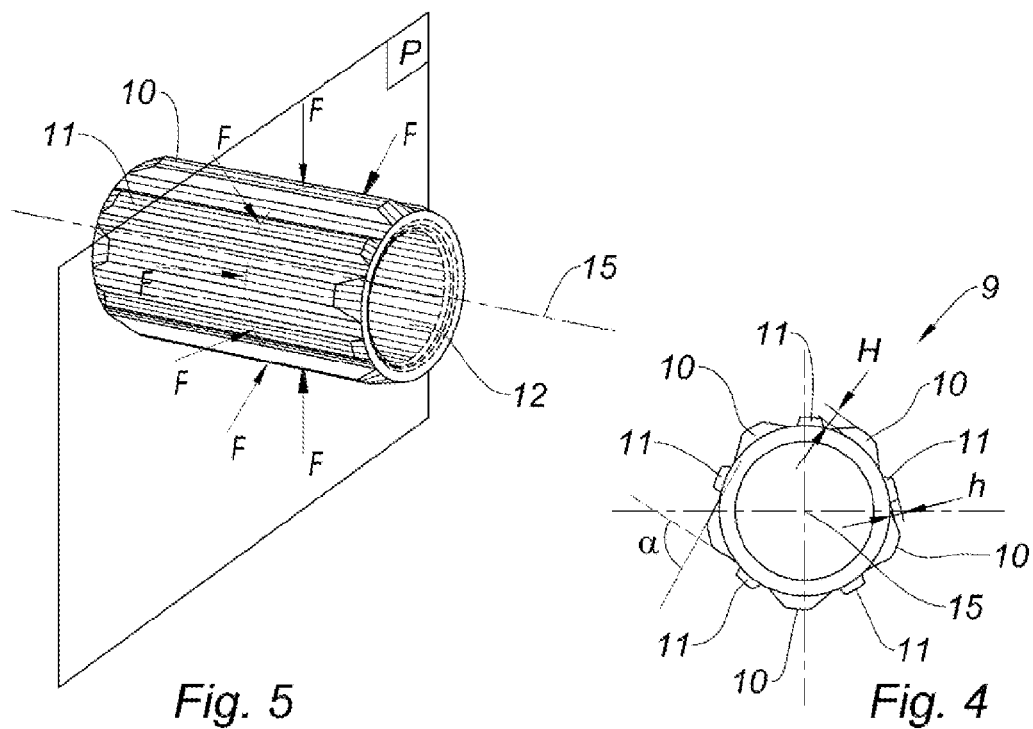
Fig. 5
Fig. 4

SLEEVE FOR DISK BRAKE CALIPER AND DISK BRAKE FITTED WITH SUCH A SLEEVE

BACKGROUND OF THE INVENTION

The present invention relates to a sleeve for a disk brake caliper and a brake disk fitted with such a sleeve.

A disk brake of the known type comprises a carrier fixed to a wheel hub of an automotive vehicle and a caliper slidably mounted in the carrier. The disk brake also comprises a first and a second lining or brake pad, capable of respectively cooperating with a first and a second face of a brake disk fixed in rotation to a wheel.

A pad, known as the internal pad, bears against one end of a hydraulic piston slidably mounted in the caliper along an axis parallel to the axis of the brake disk when the brake is applied.

In reaction, the caliper slides relative to the carrier to apply the second brake pad to the second face of the brake disk.

The caliper slides relative to the carrier by means of two arms, known as pins, extending along axes parallel to the axis of the hydraulic piston, rigidly fixed to the caliper and sliding in one respective bore formed in the carrier.

A pin is cylindrical, in the known manner, and of circular section and provided at one end with a threaded bore capable of cooperating with a screw penetrating a through-passage of the caliper, to fix the pin to the caliper.

Gaskets connect the caliper to the carrier surrounding each pin so as to preserve the contact surfaces between the pins and the bores of the carrier from soiling due to corrosion.

In order to guide the sliding of the pins, it is known to use a sleeve—also denoted as a "bushing"—in which the pin slides as disclosed, for example, in the patent application EP 1236923A2.

Such a sleeve makes it possible, in particular, to dampen low frequency vibrations generated by the caliper when there is braking and when there is no braking. This damping is all the more efficient the greater the force exerted by the sleeve on the carrier, which is promoted by a large contact surface between the sleeve and the carrier.

SUMMARY OF THE INVENTION

The present invention results from the observation that the return of the brake into a resting position is all the more rapid the more the contact surface between the sleeve and the carrier is reduced, so as to promote the sliding of the pin.

Henceforth, a relative compromise at the contact surface between the carrier and the sleeve is necessary in order to ensure, on the one hand, satisfactory damping of the low frequency vibrations and, on the other hand, a rapid return of the pin to the resting position.

The present invention aims to remedy this drawback. To this end, the invention relates to a sleeve for a disk brake fitted with a caliper slidably mounted in a carrier by means of pins fixed rigidly to the caliper, said sleeve being designed to receive one of said pins in a bore of the carrier, characterized in that the sleeve has ribs on a surface designed to be in contact with the carrier so that said ribs are deformed in order to increase said contact surface when the sleeve is compressed by an activation of the brake.

Such a sleeve makes it possible to obtain satisfactory damping of low frequency vibrations when the brake is applied. As a result, in this case, the increased contact surface between the sleeve and the carrier makes such damping possible.

Moreover, such a sleeve makes it possible to obtain a rapid return of the pin into a resting position since, when the brake is released, the contact surface between the sleeve and the carrier is reduced, which also reduces the resistive forces when the pin returns into the resting position.

In one embodiment, the sleeve has a substantially cylindrical shape along a longitudinal axis.

According to one embodiment, the ribs are of trapezoidal shape extending along the longitudinal axis of the sleeve.

In one embodiment, the sleeve has different ribs having different heights measured in a direction perpendicular to the longitudinal axis of the sleeve.

According to one embodiment, the sleeve comprises at least five ribs of the same height distributed symmetrically over its surface designed to come into contact with the carrier.

In one embodiment, the ribs are formed by a resilient and deformable material.

The invention also relates to a disk brake fitted with a caliper slidably mounted in a carrier by means of pins fixed rigidly to the caliper, a sleeve being designed to receive one of said pins in a bore of the carrier, characterized in that the sleeve has ribs on a surface designed to come into contact with the carrier so that said ribs are deformed in order to increase said contact surface when the sleeve is compressed by an activation of the brake.

BRIEF DESCRIPTION OF THE DRAWINGS

Further features and advantages of the invention will appear from reading the following description of an embodiment of the invention, by way of illustrative and non-limiting example, and with reference to the accompanying figures in which:

FIG. 2 is a sectional view of the disk brake disclosed in FIG. 1, FIGS. 3, 4 and 5 are different views of a sleeve according to the invention.

DETAILED DESCRIPTION

Figure 1:
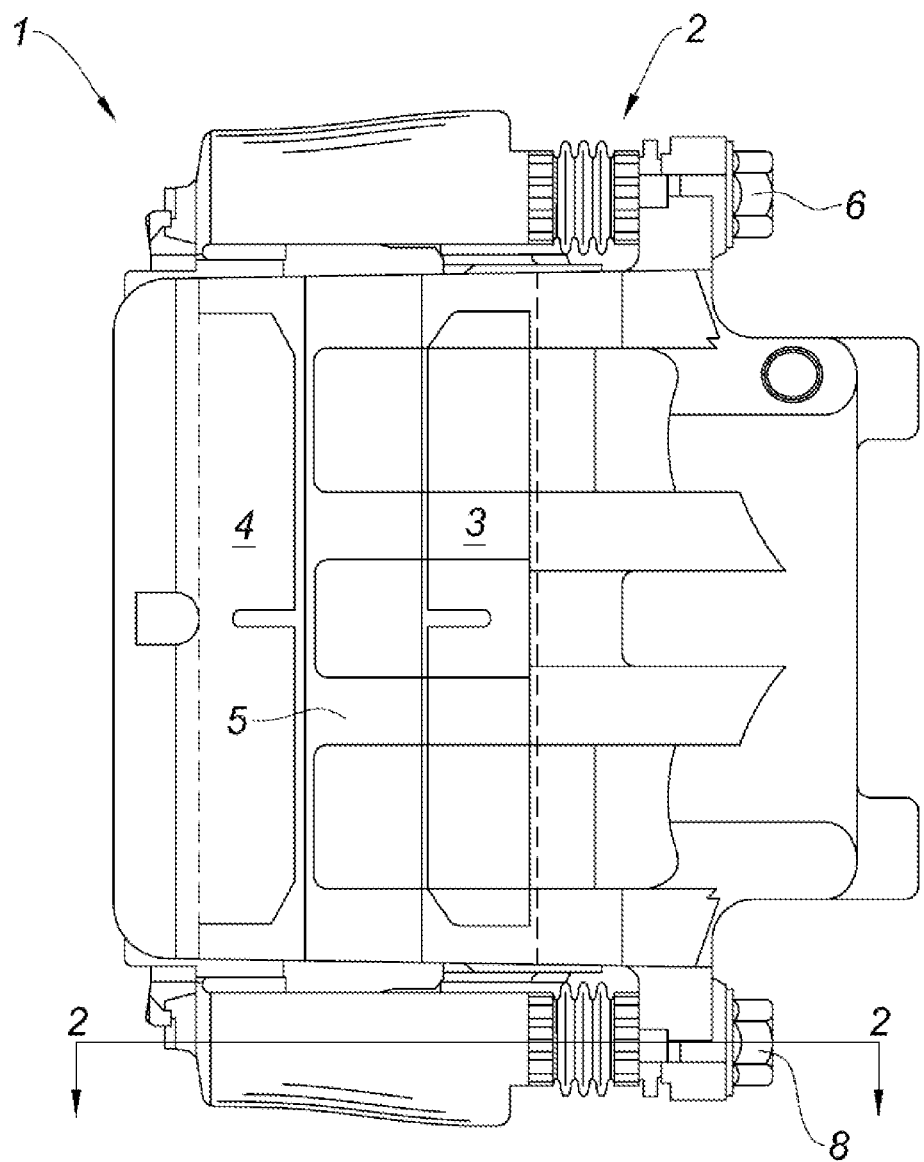
FIG. 1 shows a disk brake caliper fitted with a sleeve according to the invention.

FIG. 1 shows a disk brake caliper 1 comprising a sliding carrier 2 fitted with two plates, internal 3 and external 4, permitting the disk 5 fixed to a wheel to be clamped as disclosed above.

In order to guide the sliding of the caliper relative to the pins 6 and 8 of the caliper 1, sleeves or "bushings" are arranged between the carrier 2 and each pin 6 or 8 as shown in FIG. 2.

In said FIG. 2, a sleeve 9 associated with the pin 8 is shown in a sectional view thereof corresponding to the axis 2-2 of FIG. 1.

The sleeve 9, according to the invention, has a larger contact surface with the carrier 2 when the brake is activated.

Due to this larger contact surface, the sleeve may satisfactorily dampen the low frequency vibrations which may generate unpleasant noise during the operation of the brake.

Moreover, this contact surface is then reduced when the brake is released, which permits the sliding force of the pin to be reduced. Thus, the brake returns to a resting position in a satisfactory time which limits, in particular, the wear of the brake pads.

In order to obtain said variations of the contact surface between the sleeve 9 and the carrier 2, said sleeve 9 has longitudinal ribs 10 or 11 (FIG. 3) on its surface designed to come into contact with the carrier, whilst its internal surface designed to be in contact with the pin 8 is uniform and smooth as shown in FIG. 5.

FIGS. 3 and 5 illustrate the trapezoidal shape of the ribs extending along the longitudinal axis 15 of the sleeve.

In this embodiment, the principal ribs 10 have larger dimensions than the dimensions of secondary or intermediate ribs 11 as shown in FIG. 4. For example, the height H of the principal ribs 10 measured along the diameter of the sleeve 9 is practically double the height h of the secondary ribs 11 thus measured.

In practice, this height H may be of the order of 0.5 mm, for a conventional application in a known disk brake.

For such an application, the disclosed sleeve has five principal ribs 10, two principal ribs being equidistant from one secondary rib 11 interposed between said principal ribs.

As shown in FIG. 4, the angle α(alpha) formed by the planes tangent to the walls of the ribs is of the order of 90°.

The ribs are formed by a resilient material permitting their compression so that when the brake is activated, the ribs 10 are compressed by the force of the pin on the sleeve.

The sleeve provides a reaction force F to this compression which is, in particular, a function of the contact surface between the pin and the sleeve.

When this compression reaches a specific threshold, the compression of the principal ribs 10 is such that their height H is reduced and the secondary ribs 11 also come into contact with the carrier.

At this time, the contact surface between the sleeve and the carrier is substantially increased, which also increases the damping of the low vibrations produced by the sleeve 9.

When the brake is released, the compression exerted on the sleeve is reduced and the ribs are able to recover their shape, in particular their height H. In this case, only the principal ribs 10 are in contact with the carrier which limits the contact surface between said carrier and the sleeve, thus facilitating the return of the carrier into a resting position.

The present invention is open to many variants. In particular, the arrangement of the ribs on the surface of the sleeve may vary according to the applications of the invention.

The invention claimed is:

1. A sleeve (9) for a disk brake fitted with a caliper (1) slidably mounted in a carrier (2) by means of pins (6, 8) fixed rigidly to the caliper (1), said sleeve (9) being configured to receive one of said pins (6, 8) in a bore of the carrier (2), the sleeve (9) comprising first and second ribs (10, 11) on a surface configured to come into contact with the carrier so that said ribs (10, 11) may be deformed in order to increase said contact surface when the sleeve (9) is compressed by an activation of the brake, characterized in that the sleeve has a substantially cylindrical shape along a longitudinal axis (15), characterized in that the first ribs (10) are of trapezoidal shape extending along the longitudinal axis (15) of the sleeve (9) and may be deformed in order to increase said contact surface between the first ribs (10) and the surface, characterized in that the first and second ribs (10, 11) have different heights (H) measured from an outer surface of the sleeve (9) in a direction perpendicular to the longitudinal axis (15) of the sleeve (9).

2. A sleeve (9) according to claim 1, characterized in that the sleeve comprises at least five first ribs (10) of the same height distributed symmetrically over the surface designed to come into contact with the carrier.

3. A sleeve (9) according to claim 1, characterized in that the first and second ribs (10, 11) are formed by a resilient and deformable material.

4. A disk brake comprising a caliper (1) slidably mounted in a carrier (2) by means of pins (6, 8) fixed rigidly to the caliper (1), and a sleeve (9) receiving one of said pins in a bore of the carrier, characterized in that the sleeve (9) has first and second ribs (10, 11) on a surface in contact with the carrier (2) so that said ribs may be deformed in order to increase said contact surface when the sleeve (9) is compressed by an activation of the brake, characterized in that the sleeve (9) has a substantially cylindrical shape along a longitudinal axis (15), characterized in that the first ribs (10) are of trapezoidal shape extending along the longitudinal axis (15) of the sleeve (9) and may be deformed in order to increase said contact surface between the first ribs (10) and the surface, and characterized in that the first and second ribs (10, 11) have different heights (H) measured from an outer surface of the sleeve (9) in a direction perpendicular to the longitudinal axis (15) of the sleeve (9).

5. A disk brake according to claim 4, characterized in that the sleeve (9) comprises at least five first ribs (10) of the same height distributed symmetrically over the surface designed to come into contact with the carrier.

6. A disk brake according to claim 4, characterized in that the first and second ribs (10, 11) are formed by a resilient and deformable material.

7. A sleeve (9) according to claim 1, characterized in that the sleeve comprises at least five first ribs (10) having a first height and at least five second ribs (11) having a second height, characterized in that the first and second ribs (10, 11) alternate around a perimeter of the sleeve (9), and characterized in that the first and second ribs (10, 11) are distributed symmetrically over the surface designed to come into contact with the carrier.

8. A sleeve (9) according to claim 1, characterized in that the second ribs (11) have a rectangular shape extending along the longitudinal axis (15) of the sleeve (9) and characterized in that the first and second ribs (10, 11) alternate around a perimeter of the sleeve (9).

9. A sleeve according to claim 1, characterized in that the bore of the carrier (2) has a substantially circular cross section and characterized in that a radial end surface of each of the first and second ribs contacts the bore of the carrier (2).

10. A disk brake according to claim 4, characterized in that the first and second ribs (10, 11) alternate around a perimeter of the sleeve (9).

11. A disk brake according to claim 4, characterized in that the sleeve comprises at least five first ribs (10) having a first height and at least five second ribs (11) having a second height, characterized in that the first and second ribs (10, 11) alternate around a perimeter of the sleeve (9), and characterized in that the first and second ribs (10, 11) are distributed symmetrically over the surface designed to come into contact with the carrier.

12. A disk brake according to claim 11, characterized in that the second ribs (11) have a rectangular shape extending along the longitudinal axis (15) of the sleeve (9).

13. A disk brake according to claim 4, characterized in that the bore of the carrier (2) has a substantially circular cross section and characterized in that a radial end surface of each of the first and second ribs contacts the substantially circular cross section of the bore of the carrier (2).

* * * * *